United States Patent
Artini et al.

(10) Patent No.: US 7,165,747 B2
(45) Date of Patent: Jan. 23, 2007

(54) METHOD AND DEVICE FOR GUIDING AN AIRCRAFT FOR AIDING PARACHUTE DROPS

(75) Inventors: Franck Artini, Toulouse (FR); Edward Strongman, Bretx (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/122,104

(22) Filed: May 5, 2005

(65) Prior Publication Data

US 2006/0102797 A1    May 18, 2006

(30) Foreign Application Priority Data

May 18, 2004    (FR)    .................................. 04 05383

(51) Int. Cl.
*B64D 1/02* (2006.01)
(52) U.S. Cl. .................... 244/137.1; 244/175; 244/195
(58) Field of Classification Search ............ 244/137.1, 244/137.3, 137.4, 175, 177, 180, 183, 185, 244/186, 188, 194–195
See application file for complete search history.

(56) References Cited

U.S. PATENT DOCUMENTS

| | | | | |
|---|---|---|---|---|
| 3,323,762 A | * | 6/1967 | Mylrea, Sr. et al. | 244/138 R |
| 3,401,905 A | * | 9/1968 | Rohrlick | 244/137.3 |
| 4,651,957 A | * | 3/1987 | Minnich, II | 244/137.3 |
| 4,692,869 A | * | 9/1987 | King et al. | 701/206 |
| 5,110,071 A | * | 5/1992 | Hunter et al. | 244/137.3 |
| 5,816,535 A | * | 10/1998 | Underwood et al. | 244/137.3 |
| 6,289,270 B1 | | 9/2001 | Baumgarten | |
| 6,334,344 B1 | * | 1/2002 | Bonhoure et al. | 70/11 |

FOREIGN PATENT DOCUMENTS

| | | |
|---|---|---|
| DE | 4339251 | 4/1995 |
| EP | 0610128 | 8/1994 |
| GB | 1428948 | 3/1976 |

OTHER PUBLICATIONS

Taylor et al, ("A Reconfirurable Intergrated Navigation and Flight Management System for Military Transport Aircraft"). 1989, pp. 1775-1781.*

* cited by examiner

*Primary Examiner*—Galen Barefoot
(74) *Attorney, Agent, or Firm*—Stevens, Davis, Miller & Mosher, LLP

(57) ABSTRACT

The device (1) for guiding an aircraft at least over an intermediate trajectory between a first flight trajectory for a low-altitude flight and a second flight trajectory which starts at an initial point, and from which trajectory a parachute drop is carried out, comprises means (9) for determining a point of transition which lies on the first flight trajectory which represents the start of the intermediate trajectory, and which corresponds to the point where the aircraft must exit the first flight trajectory so as to reach the initial point under predetermined flight conditions, and means (13A, 13B) which use the point of transition to aid the guidance of the aircraft between the first and second flight trajectories.

14 Claims, 3 Drawing Sheets

METHOD AND DEVICE FOR GUIDING AN AIRCRAFT FOR AIDING PARACHUTE DROPS

FIELD OF THE INVENTION

The present invention relates to a method and a device for guiding an aircraft.

BACKGROUND OF THE RELATED ART

More precisely, the guidance of the aircraft is implemented at least over an intermediate trajectory between a first flight trajectory for a low-altitude flight, and a second flight trajectory which starts at an initial point, and from which trajectory a parachute drop is carried out.

The present invention applies therefore to a parachute drop from an aircraft, in particular from a military transport plane, of elements, especially hardware and/or troops, that must be dropped by parachute onto a determined reception zone on the ground. To be able to carry out such a parachute drop under good conditions, it is necessary for the aircraft to arrive in a stabilized manner, at the right speed (with an appropriate acceleration), at the right altitude and in an aerodynamic configuration appropriate to said initial point corresponding to the start of said (second) flight is be carried out.

Additionally, to be able to carry out such a parachute drop as discretely as possible, the aircraft is generally made to fly along a low-altitude approach trajectory, up to said second flight trajectory, to allow the aircraft to benefit from masking by the terrain and thus not be easily detectable.

Moreover, to attempt to reach said initial point under the aforesaid particular conditions, the pilot of such an aircraft generally has at his disposal only information relating to a point of deceleration which is situated upstream of said initial point, and from which he is advised to decelerate the aircraft. However, this point of deceleration takes no account of the profile of the terrain on the approach to the parachute drop zone, and the pilot must therefore manually adjust the piloting of the aircraft so as to reach said initial point with said aforesaid particular conditions, this naturally being very difficult to achieve.

SUMMARY OF THE INVENTION

The present invention relates to a method of guiding an aircraft at least over an intermediate trajectory between a first flight trajectory for a low-altitude flight and a second flight trajectory which starts at an initial point, and from which trajectory a parachute drop is carried out, which method of guidance makes it possible to remedy the aforesaid drawbacks.

To this end, according to the invention, said method of guidance is noteworthy in that:

a) a point of transition which lies on said first flight trajectory is determined, which represents the start of said intermediate trajectory, and which corresponds to the point where the aircraft must exit said first flight trajectory so as to reach said initial point under predetermined flight conditions; and b) said point of transition is used to guide the aircraft between said first and second flight trajectories.

Thus, by virtue of the invention, the point (point of transition) where the aircraft must exit said first flight trajectory to be able to reach said initial point, under predetermined flight conditions, is known, making it possible to carry out a parachute drop under the best possible arrangements.

Preferably, said predetermined flight conditions relate to at least certain of the following conditions:

a predetermined speed;
a predetermined altitude;
a predetermined aerodynamic configuration of the aircraft;
a rate of deceleration;
a parachute drop schedule to be complied with; and
a maximum ground slope for regaining the parachute drop altitude.

The present invention is appropriate both to manual guidance, and to automatic guidance in terms of trajectory and speed (time). Thus, advantageously:

in a first variant pertaining in particular to manual guidance, in step b), said point of transition is presented to a pilot of the aircraft; and in a second variant, when the aircraft is guided automatically, the automatic guidance for following said intermediate trajectory is triggered at said point of transition.

In a particular embodiment, in step a), to determine said point of transition:

a first straight line exhibiting a first slope which is positive and a second straight line exhibiting a second slope which is negative are projected into the vertical plane, from said initial point, upstream;

the various points of crossover between, on the one hand, said first and second straight lines and, on the other hand, said first flight trajectory are determined, in the vertical plane; and one of said points of crossover, namely that which is situated closest to said initial point, is chosen as point of transition, so as to benefit for as long as possible from the masking by the terrain.

Moreover, advantageously, said intermediate trajectory corresponds to a straight line segment connecting said point of transition to said initial point.

Furthermore, to afford additional aid making it possible in particular to bring the aircraft in the most stabilized manner possible to said initial point, advantageously:

in step a), in addition:
at least one first auxiliary point corresponding to a point of change of speed where the aircraft must decelerate is determined; and/or
at least one second auxiliary point corresponding to a point of change of aerodynamic configuration of the aircraft is determined. Provision is generally made for several second auxiliary points which pertain respectively to the various successive aerodynamic configurations to be instructed before arriving at the suitable aerodynamic configuration; and in step b), said first auxiliary point and/or said second auxiliary point is/are used to pilot the aircraft.

In a particular embodiment, said second flight trajectory, from which the parachute drop is carried out, is inserted into a low-altitude flight section comprising:

said first flight trajectory, for a low-altitude flight, upstream of said second flight trajectory; and
a third flight trajectory, likewise for a low-altitude flight, downstream of said second flight trajectory.

By virtue of this particular embodiment, the aircraft can continue to fly at low altitude or return to a low-altitude flight after the parachute drop phase (with a parachute drop performed, interrupted or abandoned) and thus benefit from the masking by the terrain.

In this case, advantageously:

in step a), in addition an auxiliary transition point is determined, which lies on said second flight trajectory, which represents the start of an auxiliary intermediate trajectory between said second and third flight trajectories, and which corresponds to the point where the aircraft must exit said second flight trajectory in order to join up with said third flight trajectory; and in step b), said auxiliary transition point is used to guide the aircraft between said second and third flight trajectories.

The present invention also relates to a device for guiding an aircraft at least over an intermediate trajectory between a first flight trajectory for a low-altitude flight and a second flight trajectory which starts at an initial point, and from which trajectory a parachute drop is carried out.

According to the invention, said guidance device is noteworthy in that it comprises:

first means for determining a point of transition which lies on said first flight trajectory, which represents the start of said intermediate trajectory, and which corresponds to the point where the aircraft must exit said first flight trajectory so as to reach said initial point under predetermined flight conditions; and second means which use said point of transition to aid the guidance of the aircraft between said first and second flight trajectories.

Moreover, in a particular embodiment, said second means comprise:

means of visualization for presenting said point of transition on at least one display screen, of head-up type or of head-down type, in horizontal and/or vertical section; and/or an automatic guidance system (triggerable by a pilot) for automatically guiding said aircraft at least along said intermediate trajectory.

The device in accordance with the invention therefore affords valuable aid allowing an aircraft flying at low altitude to reach the start of a parachute drop phase under the best possible conditions, both under manual guidance and under automatic guidance.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
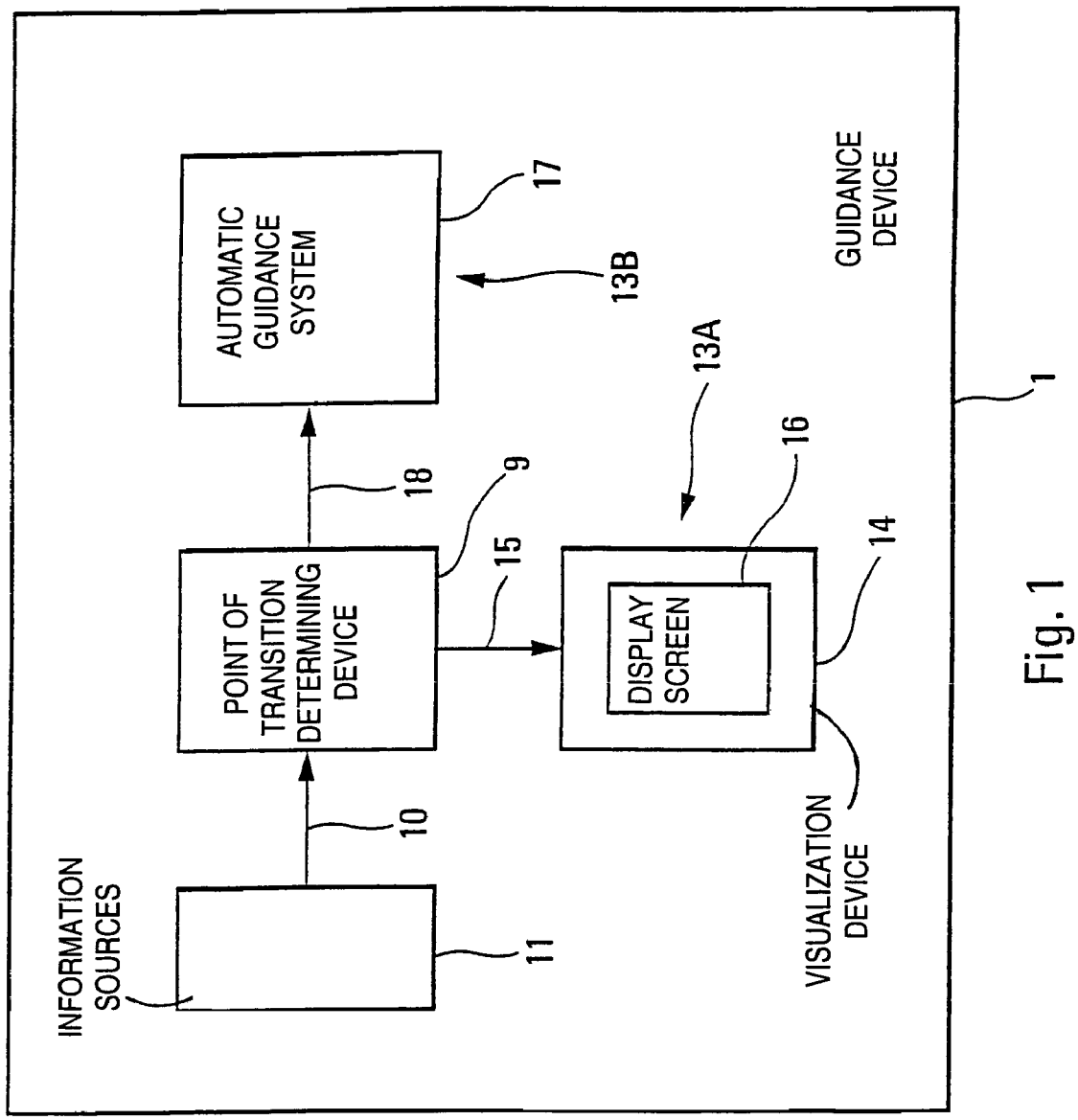
FIG. 1 is the schematic diagram of a device in accordance with the invention.

The guidance device considered here is a standard guidance device for an aircraft A, in particular for a military transport plane, which allows the implementation, in standard fashion, of manual guidance by a pilot of the aircraft A and/or of automatic guidance, for example by way of an automatic piloting system. The essential characteristics of such a guidance device are known and do not come directly into the framework of the present invention. Also, for the purpose of simplifying the drawing, only the characteristics used for the implementation of the present invention have been represented in FIG. 1.

Figure 2:
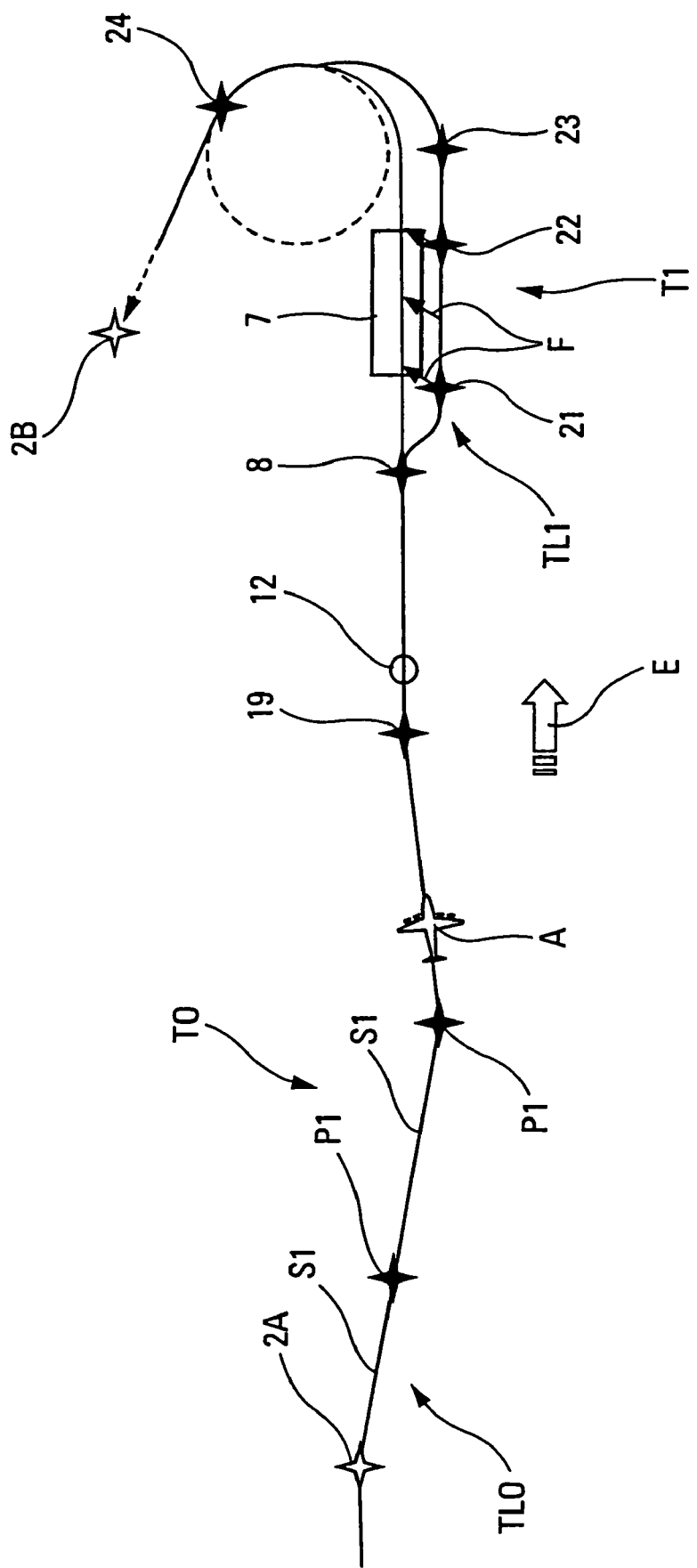
FIGS. 2 and 3 are two graphics, respectively in the lateral plane and in the vertical plane, contributing to a proper explanation of the essential characteristics of the present invention.
Figure 3:
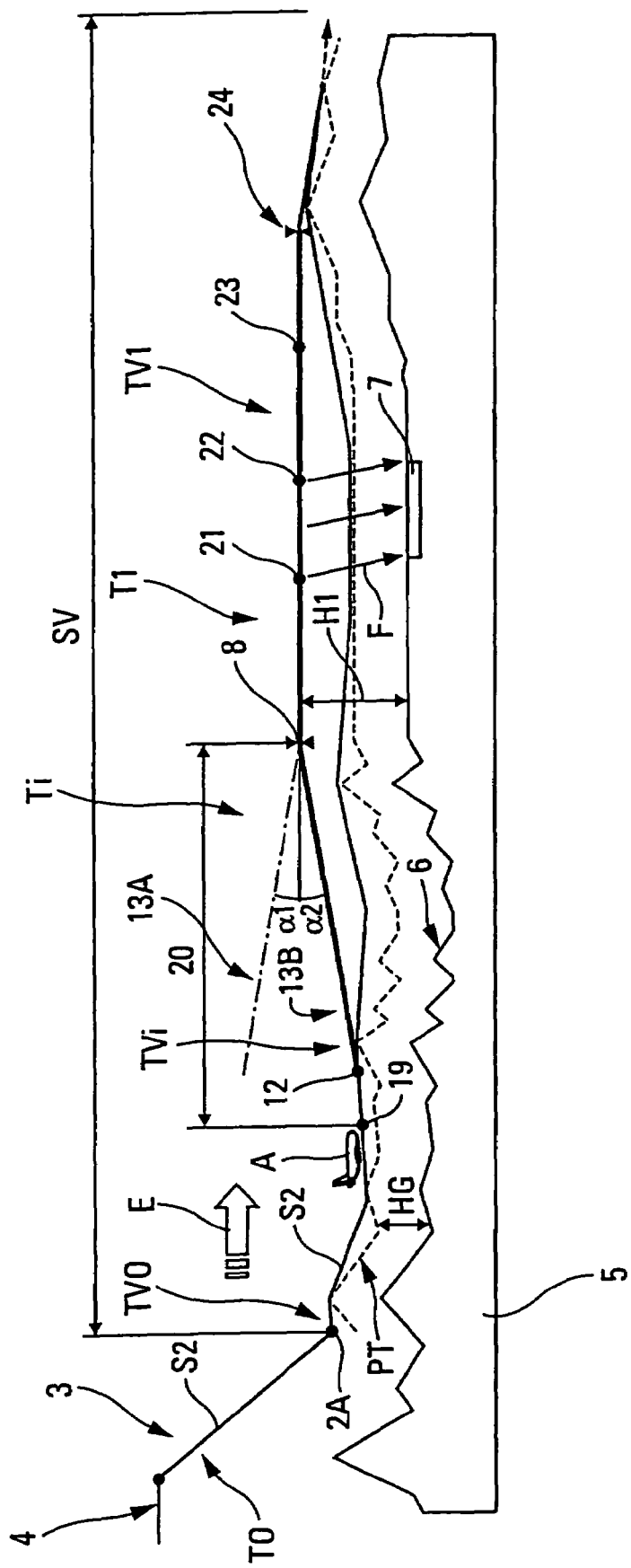

Said guidance device 1 makes it possible to guide the aircraft A along a flight trajectory TO comprising a lateral trajectory TLO defined in a lateral plane and represented partially in FIG. 2 and a vertical trajectory TVO (or flight profile) defined in a vertical plane and represented partially in FIG. 3. As may be seen in this FIG. 3, this flight trajectory TO comprises a section SV of low-altitude flight which commences at a point 2A, for example following a descent 3 from a phase of cruising 4 at stabilized altitude, and terminates at a point 2B. At the level of this low-altitude flight section SV, the flight trajectory TO (at low altitude) must allow the aircraft A to follow as closely as possible the terrain overflown 5. To do this, the vertical trajectory TVO is calculated, over this low-altitude flight section SV, from a terrain profile PT which is situated (at a predetermined guard height HG) above the relief 6 of the terrain 5 overflown, as represented in FIG. 3.

In a preferred embodiment, said flight trajectory TO is a so-called string-like trajectory which consists of rectilinear segments (rectilinear segments S1 in the lateral plane, separated by waypoints P1 as represented in FIG. 2, and rectilinear segments S2 in the vertical plane as represented in FIG. 3), whose lateral and vertical transitions are arcs of a circle of constant radius which stem from considerations of preset speed and of maximum load factors allowable. Of course, the flight trajectory may also be continuously curved in the vertical plane and/or in the lateral plane. This flight trajectory TO can be an anticipated trajectory, determined with the aid of predicted climb and descent performance. Moreover, it is calculated with the aid of a digital database for the terrain and hugs, as closely as possible, the configuration of the relief 6 of the terrain 5 overflown.

The present invention relates to the case where, during a flight over a low-altitude flight section SV such as this, a parachute drop phase must be implemented. Such a parachute drop phase consists in dropping by parachute, onto a determined ground reception zone 7, elements such as hardware and/or troops. To be able to carry out such a parachute drop under good conditions, it is necessary for the aircraft A to arrive in a stabilized manner, at an appropriate speed and in an appropriate aerodynamic configuration, at an initial point 8 corresponding to the start of a stretch of flight trajectory T1 (with a lateral trajectory TL1 and a vertical trajectory TV1 which is situated at a height H1 above the ground), in the course of which the parachute drop is carried out. It must also comply with presets for slope, acceleration, time, etc.

According to the invention, to allow the aircraft A to arrive under the aforesaid conditions at said initial point 8, the guidance device 1 in accordance with the invention comprises:

means 9 which are connected by a link 10 to a set 11 of information sources and which make it possible to determine a point of transition 12:

which lies on said low-altitude flight trajectory TO;

which represents the start of an intermediate trajectory Ti, whose vertical trajectory TVi is represented in FIG. 3, said intermediate trajectory Ti making it possible to connect said trajectories TO and T1; and which corresponds to the point where the aircraft A must exit said low-altitude flight trajectory TO so as to reach said initial point 8 (of the flight trajectory T1 of the parachute drop phase) under predetermined flight conditions. In a preferred embodiment, said predetermined flight conditions relate to at least:
a predetermined speed;
a predetermined altitude;
a predetermined aerodynamic configuration of the aircraft A;
a rate of deceleration;
a parachute drop schedule to be complied with; and
a maximum ground slope for regaining the parachute drop altitude; and means 13A, 13B which use said point of transition 12 to aid in guiding the aircraft A between said flight trajectories TO and T1.

Thus, by virtue of said device 1, the point (point of transition 12) where the aircraft A must exit said low-altitude flight trajectory TO so as to be able to reach said initial point 8 under appropriate flight conditions is known, making it possible to carry out, from the flight trajectory T1, a parachute drop under the best possible arrangements, as specified hereinafter.

It will be noted that by virtue of a low-altitude approach to the parachute drop zone 7, the aircraft A can benefit from effective masking by the terrain 5 overflown.

Within the framework of the present invention, the expression particular "aerodynamic configuration" is understood to mean a particular combination of the positions of movable elements (lift-enhancing flaps, landing gear, etc.), on which the aerodynamic characteristics of the aircraft A depend.

In a particular embodiment:
said means 13A comprise means of visualization 14 which are connected by a link 15 to the means 9 and which make it possible to present on a display screen 16 in particular said point of transition 12, as well as other information specified hereinbelow. Said display screen 16 can be a head-up screen or a head-down screen. It may also be a horizontal display or a vertical display; and
said means 13B comprise a standard automatic guidance system 17 which is connected by a link 18 to said means 9. This standard automatic guidance system 17 comprises means for determining piloting orders and means for actuating controlled members (control surfaces, etc.), to which these piloting orders are applied.

The present invention applies equally well to a flight under VMC conditions (VMC standing for "Visual Meteorological Conditions"), that is to say meteorological fly-by-sight conditions which are expressed as a function of visibility, of distance with respect to the clouds and to the ceiling, conditions equal to or greater than specified minima, as to flight under IMC conditions (IMC standing for "Instrument Meteorological Conditions"), that is to say meteorological instrument flight conditions which are expressed as a function of visibility, of distance with respect to the clouds and the ceiling, namely conditions less than the minima specified for the meteorological fly-by-sight conditions.

Said set 11 of information sources provides in particular:
the low-altitude flight trajectory TO, as predicted;
the parachute drop procedure planned with the flight trajectory T1;
a current speed preset for the aircraft A; and
the speed vector (position, speed, aerodynamic configuration) of the aircraft A.

Said set 11 of information sources also provides the time, the slope, the acceleration etc. chosen by the operator.

Thus, by virtue of the device 1 in accordance with the invention, the aircraft A can reach the point 8 of the flight trajectory T1 in a stabilized manner, that is to say at the predetermined speed and at the predetermined altitude and in the envisaged aerodynamic configuration, while complying with the presets for time, for slope, for deceleration etc. This is very important for allowing the parachute drop under the best possible stability conditions, after a low-altitude approach which is often unstable, since the aircraft A then follows the relief 6 of the terrain 5 as much as possible, for masking reasons in particular. The device 1 in accordance with the invention therefore makes it possible to increase the comfort of piloting, and to reduce the workload of the crew in such an approach phase which is often very demanding, while making it possible to reach said initial point 8 under the best possible conditions.

It will be noted that, during automatic guidance, if, at said point of transition 12, the corresponding guidance mode is not activated, the aircraft A continues to fly at low altitude along said flight trajectory TO (at low altitude).

In a particular embodiment, the means 9 determine said point of transition 12, by carrying out the following operations:
they project into the vertical plane, from said initial point 8, as represented in FIG. 3, upstream (that is to say rearward, in the direction opposite to the direction of flight E of the aircraft A) a first straight line 13A exhibiting a positive slope $\alpha 1$ and a second straight line 13B exhibiting a negative slope $\alpha 2$. Preferably, the two slopes $\alpha 1$ and $\alpha 2$ exhibit the same absolute value, for example 3°;
they determine, in the vertical plane, the various points of crossover between, on the one hand, said straight lines 13A and 13B, and, on the other hand, said vertical trajectory TVO; and
they select as transition point 12, one of said crossover points thus determined, namely that which is situated closest to said initial point 8.

In the example represented in FIG. 3, the vertical trajectory TVi of the intermediate trajectory Ti therefore corresponds to the segment of said straight line 13B, which is situated between the initial point 8 and the point of transition 12 determined in the manner specified hereinabove.

Furthermore, in a particular embodiment, said means 9 additionally determine the following points, which are presented to a pilot of the aircraft A by the display means 14:
auxiliary points corresponding to points of change of speed, where the aircraft A must decelerate, according to a predetermined rate of deceleration, so as to reach said initial point 8 in a stabilized manner at the right speed. This is very important for being able to carry out a good parachute drop and depends in particular on the type of elements to be dropped by parachute. The first of said auxiliary points, 19, may be different from said point of transition 12, as represented in FIG. 3 which also shows a phase of preparation 20 between said points 19 and 8; and
additional auxiliary points (not represented) corresponding to points of change of aerodynamic configuration of the aircraft A. These additional auxiliary points also allow the aircraft A not to arrive too fast at said initial point 8.

Thus, by virtue of the invention, the parachute drop can be carried out under the best possible conditions.

In order to carry out such a parachute drop, it is necessary in a known manner to determine the following points of the flight trajectory TV1, defined successively in the direction E of flight of the aircraft A;

a release point 21 where the elements to be dropped by parachute must be released from said aircraft A, this being as near as possible up to an end of release point 22, so that these elements can reach the parachute drop zone 7, as illustrated by arrows F taking account of the effect of the wind. This release point 21 therefore takes account of the wind which pushes the parachutes: this is what explains the lateral deviation of this point 21 with respect to the strip 7 in FIG. 3;

said end of release point 22;

a point 23 of end of the parachute drop sequence; and a point 24 of start of pick-up of the low altitude flight trajectory TO.

In a preferred embodiment, said display means 14 also present at least said point 24 to the pilot of the aircraft A. This point 24 corresponds to the start of an intermediate flight phase making it possible to regain said low altitude trajectory TO.

As the point 2B of end of the low altitude flight section SV is situated downstream of said point 24, in the direction of flight E of the aircraft A, the latter therefore continues to fly at low altitude after the parachute drop, and thus to benefit from masking by the terrain 5.

The invention claimed is:

1. A method of guiding an aircraft at least over an intermediate trajectory between a first flight trajectory for a low-altitude flight and a second flight trajectory which starts at an initial point, and from which trajectory a parachute drop is carried out, said method comprising:

projecting a first straight line exhibiting a first slope which is positive and a second straight line exhibiting a second slope which is negative into a vertical plane, from said initial point, upstream;

determining the various points of crossover between, on the one hand, said first and second straight lines and, on the other hand, said first flight trajectory, in the vertical plane; and selecting one of said points of crossover, namely that which is situated closest to said initial point, as a point of transition; and using said point of transition to guide the aircraft between said first and second flight trajectories, wherein said point of transition lies on said first flight trajectory, represents the start of said intermediate trajectory, and corresponds to the point where the aircraft must exit said first flight trajectory so as to reach said initial point under predetermined flight conditions.

2. The method as claimed in claim 1, wherein said predetermined flight conditions relate to at least certain of the following conditions:

a predetermined speed;

a predetermined altitude;

a predetermined aerodynamic configuration of the aircraft;

a rate of deceleration;

a parachute drop schedule to be complied with; and a maximum ground slope for regaining the parachute drop altitude.

3. The method as claimed in claim 1, wherein said point of transition is presented to a pilot of the aircraft.

4. The method as claimed in claim 1, wherein, when the aircraft is guided automatically, the automatic guidance for following said intermediate trajectory is triggered at said point of transition.

5. The method as claimed in claim 1, wherein said intermediate trajectory corresponds to a straight line segment connecting said point of transition to said initial point.

6. A method of guiding an aircraft at least over an intermediate trajectory between a first flight trajectory for a low-altitude flight and a second flight trajectory which starts at an initial point, and from which trajectory a parachute drop is carried out, said method comprising:

determining a point of transition which lies on said first flight trajectory, represents the start of said intermediate trajectory, and corresponds to the point where the aircraft must exit said first flight trajectory so as to reach said initial point under predetermined flight conditions;

determining at least one auxiliary point corresponding to a point of change of speed where the aircraft must decelerate;

using said point of transition to guide the aircraft between said first and second flight trajectories; and using said auxiliary point to pilot the aircraft.

7. A method of guiding an aircraft at least over an intermediate trajectory between a first flight trajectory for a low-altitude flight and a second flight trajectory which starts at an initial point, and from which trajectory a parachute drop is carried out, said method comprising:

determining a point of transition which lies on said first flight trajectory, represents the start of said intermediate trajectory, and corresponds to the point where the aircraft must exit said first flight trajectory so as to reach said initial point under predetermined flight conditions;

determining at least one auxiliary point corresponding to a point of change of aerodynamic configuration of the aircraft;

using said point of transition to guide the aircraft between said first and second flight trajectories; and using said auxiliary point to pilot the aircraft.

8. A method of guiding an aircraft at least over an intermediate trajectory between a first flight trajectory for a low-altitude flight and a second flight trajectory which starts at an initial point, and from which trajectory a parachute drop is carried out, said method comprising:

determining a point of transition which lies on said first flight trajectory, represents the start of said intermediate trajectory, and corresponds to the point where the aircraft must exit said first flight trajectory so as to reach said initial point under predetermined flight conditions;

inserting said second flight trajectory, from which the parachute drop is carried out, into a low-altitude flight section comprising:

said first flight trajectory, for a low-altitude flight, upstream of said second flight trajectory; and a third flight trajectory, likewise for a low-altitude flight, downstream of said second flight trajectory; and using said point of transition to guide the aircraft between said first and second flight trajectories.

9. A method of guiding an aircraft at least over an intermediate trajectory between a first flight trajectory for a low-altitude flight and a second flight trajectory which starts at an initial point, and from which trajectory a parachute drop is carried out, said method comprising:

determining a point of transition which lies on said first flight trajectory, represents the start of said intermediate trajectory, and corresponds to the point where the aircraft must exit said first flight trajectory so as to reach said initial point under predetermined flight conditions;

inserting said second flight trajectory, from which the parachute drop is carried out, into a low-altitude flight section comprising:
  said first flight trajectory, for a low-altitude flight, upstream of said second flight trajectory; and
  a third flight trajectory, likewise for a low-altitude flight, downstream of said second flight trajectory;
determining an auxiliary transition point, which lies on said second flight trajectory, which represents the start of an auxiliary intermediate trajectory between said second and third flight trajectories, and which corresponds to the point where the aircraft must exit said second flight trajectory in order to join up with said third flight trajectory;
using said point of transition to guide the aircraft between said first and second flight trajectories; and
using said auxiliary transition point to guide the aircraft between said second and third flight trajectories.

10. A device for guiding an aircraft at least over an intermediate trajectory between a first flight trajectory for a low-altitude flight and a second flight trajectory which starts at an initial point, and from which trajectory a parachute drop is carried out, which device comprises:
  a first section that: (1) projects a first straight line exhibiting a first slope which is positive and a second straight line exhibiting a second slope which is negative into a vertical plane, from said initial point, upstream; (2) determines the various points of crossover between, on the one hand, said first and second straight lines and, on the other hand, said first flight trajectory, in the vertical plane; and (3) selects one of said points of crossover, namely that which is situated closest to said initial point, as a point of transition which lies on said first flight trajectory, which represents the start of said intermediate trajectory, and which corresponds to the point where the aircraft must exit said first flight trajectory so as to reach said initial point under predetermined flight conditions; and
  a second section which uses said point of transition to aid the guidance of the aircraft between said first and second flight trajectories.

11. The device as claimed in claim 10, wherein said second section comprises a visualization device that presents said point of transition on at least one display screen.

12. The device as claimed in claim 10, wherein said second section comprises an automatic guidance system for automatically guiding said aircraft at least along said intermediate trajectory.

13. An aircraft, which comprises a device such as that specified under claim 10.

14. An aircraft, which comprises a device able to implement the method specified under claim 1.

* * * * *